US012669870B2

(12) United States Patent
Cheng

(10) Patent No.: US 12,669,870 B2
(45) Date of Patent: Jun. 30, 2026

(54) MULTI-SENSORY HUMAN-COMPUTER INTERACTION SYSTEM AND MULTI-SENSORY HUMAN-COMPUTER INTERACTION METHOD

(71) Applicant: Yi-Chi Cheng, New Taipei City (TW)

(72) Inventor: Yi-Chi Cheng, New Taipei City (TW)

( * ) Notice: Subject to any disclaimer, the term of this patent is extended or adjusted under 35 U.S.C. 154(b) by 0 days.

(21) Appl. No.: 19/008,668

(22) Filed: Jan. 3, 2025

(65) Prior Publication Data

US 2026/0079579 A1     Mar. 19, 2026

(30) Foreign Application Priority Data

Sep. 19, 2024    (TW) ................................. 113135566

(51) Int. Cl.
*G06F 3/01* (2006.01)
*B25J 13/06* (2006.01)
*B25J 13/08* (2006.01)
*G06N 3/008* (2023.01)

(52) U.S. Cl.
CPC .............. *G06F 3/016* (2013.01); *B25J 13/06* (2013.01); *B25J 13/08* (2013.01); *G06F 3/015* (2013.01); *G06N 3/008* (2013.01)

(58) Field of Classification Search
CPC . G06F 3/016; G06F 3/015; B25J 13/06; B25J 13/08; G06N 3/008
See application file for complete search history.

(56) References Cited

U.S. PATENT DOCUMENTS

| | | | |
|---|---|---|---|
| 2017/0008174 A1* | 1/2017 | Rosen | .................... B25J 9/1697 |
| 2019/0077007 A1* | 3/2019 | Mallinson | ............ A61B 5/1128 |
| 2021/0073584 A1* | 3/2021 | St. Romain, II | ..... G06N 3/0475 |
| 2021/0142047 A1 | 5/2021 | Sengupta et al. | |
| 2021/0174134 A1* | 6/2021 | Zhang | ................... G06F 18/211 |
| 2022/0101593 A1 | 3/2022 | Rockel et al. | |

(Continued)

FOREIGN PATENT DOCUMENTS

| | | |
|---|---|---|
| CN | 108734629 A | 11/2018 |
| CN | 110716641 A | 1/2020 |
| CN | 107251103 B | 3/2021 |

(Continued)

*Primary Examiner* — Stephen G Sherman
(74) *Attorney, Agent, or Firm* — CKC & Partners Co., LLC

(57) ABSTRACT

A multi-sensory human-computer interaction system includes an interactive device, sensors and a server. The server is coupled to the sensors and is configured to control the interactive device. The multi-sensory human-computer interaction system performs the following operations: each of the plurality of sensors receives a plurality of sensing signals from a real environment; the server generates a plurality of event data corresponding to each of the plurality of sensing signals according to the plurality of sensing signals, wherein a plurality of event data represents the situation of the real environment; the server generates a plurality of multi-sensory correlation data corresponding to the situation according to the plurality of event data; the server determines a sensory feedback result according to the plurality of multi-sensory correlation data; and the interactive device is configured to generate interactive messages according to sensory feedback result. The interactive messages are configured to interact with users.

15 Claims, 3 Drawing Sheets

(56) References Cited

U.S. PATENT DOCUMENTS

2024/0176414 A1    5/2024  Mclachlan et al.

FOREIGN PATENT DOCUMENTS

| | | | |
|---|---|---|---|
| CN | 116185203 | A | 5/2023 |
| JP | 2018014094 | A | 1/2018 |
| JP | 2018067100 | A | 4/2018 |
| JP | 2019159193 | A | 9/2019 |
| JP | 2022037957 | A | 3/2022 |
| JP | 2022526702 | A | 5/2022 |
| JP | 2025051579 | A | 4/2025 |
| TW | 1672168 | B | 9/2019 |
| TW | M652806 | U | 3/2024 |
| TW | 1843074 | B | 5/2024 |
| WO | 2024090078 | A1 | 5/2024 |

* cited by examiner

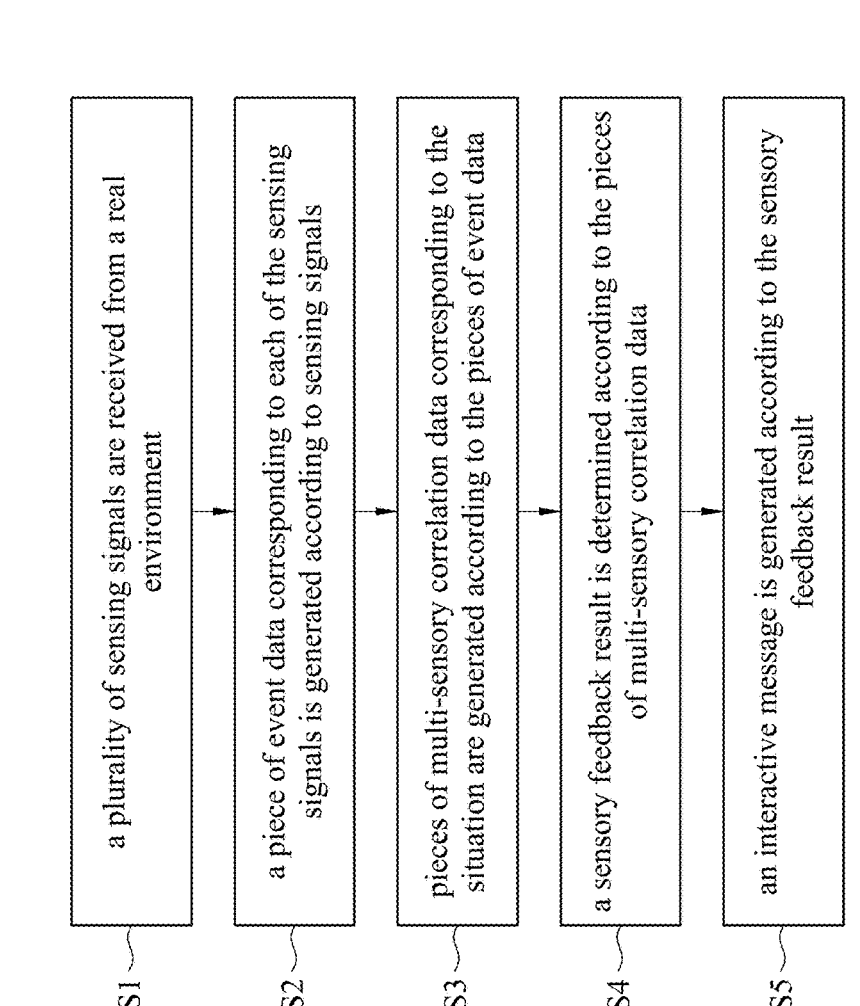

20

S1  a plurality of sensing signals are received from a real environment

S2  a piece of event data corresponding to each of the sensing signals is generated according to sensing signals S3  pieces of multi-sensory correlation data corresponding to the situation are generated according to the pieces of event data S4  a sensory feedback result is determined according to the pieces of multi-sensory correlation data S5  an interactive message is generated according to the sensory feedback result

Fig. 3

MULTI-SENSORY HUMAN-COMPUTER INTERACTION SYSTEM AND MULTI-SENSORY HUMAN-COMPUTER INTERACTION METHOD

CROSS-REFERENCE TO RELATED APPLICATION

This application claims priority to Taiwan Application Serial Number 113135566, filed Sep. 19, 2024, which is herein incorporated by reference in its entirety.

BACKGROUND

Field of Invention

The present disclosure relates to an electronic system and a method. More particularly, the present disclosure relates to a human-computer interaction system and method for multiple sensory sensors and multiple sensory output devices.

Description of Related Art

Conventional augmented reality and virtual reality experiences are limited to visual, auditory and basic tactile feedback. However, there are still many challenges in augmented reality and virtual reality experiences. Conventional system lacks responses such as body temperature, heartbeat, pulse, smell, taste, and human brain waves, resulting in a poor interactive experience between virtual characters or interactive devices and users. In addition, with an impact of global birthrate decline, a problem of job shortage is becoming increasingly serious.

For the foregoing reasons, there is a need for providing a human-computer interaction system and method for multiple sensory sensors and multiple sensory output devices to solve the above problems encountered in related art approaches.

SUMMARY

One aspect of the present disclosure provides a multi-sensory human-computer interaction system. The multi-sensory human-computer interaction system includes an interactive device, a plurality of sensors and a server. The server is coupled to the sensors, and is configured to control the interactive device. The multi-sensory human-computer interaction system executes following operations: receiving a plurality of sensing signals from a real environment respectively by each of the sensors; generating a piece of event data corresponding to each of the sensing signals according to sensing signals by the server, wherein the pieces of event data represent a situation of the real environment; generating pieces of multi-sensory correlation data corresponding to the situation according to the pieces of event data by the server; determining a sensory feedback result according to the pieces of multi-sensory correlation data by the server; and generating an interactive message according to the sensory feedback result by the interactive device, wherein the interactive message is configured to interact with a user.

Another aspect of the present disclosure provides a multi-sensory human-computer interaction method. The multi-sensory human-computer interaction method is executed following steps through a multi-sensory human-computer interaction system. The multi-sensory human-computer interaction method includes following steps: receiving a plurality of sensing signals from a real environment; generating a piece of event data corresponding to each of the sensing signals according to sensing signals, wherein the pieces of event data represent a situation of the real environment; generating pieces of multi-sensory correlation data corresponding to the situation according to the pieces of event data; determining a sensory feedback result according to the pieces of multi-sensory correlation data; and generating an interactive message according to the sensory feedback result to control an interactive device, wherein the interactive message is configured to interact with a user.

In view of the aforementioned shortcomings and deficiencies of the prior art, the present disclosure provides a technology for a multi-sensory human-computer interaction system and a multi-sensory human-computer interaction method, which can provide users with an immersive experience. Through augmented reality, virtual reality, mixed reality and interactive multimedia technology (Kiosk) technology, users can experience realistic multi-sensory effects, making the experience more real. In addition, the multi-sensory human-computer interaction system can actively assist or provide suggestions to allow users to deal with real-world situations.

BRIEF DESCRIPTION OF THE DRAWINGS

The present disclosure can be more fully understood by reading the following detailed description of the embodiment, with reference made to the accompanying drawings as follows:

FIG. 3 depicts a flow chart of a multi-sensory human-computer interaction method according to some embodiments of the present disclosure.

DETAILED DESCRIPTION

Figure 1:
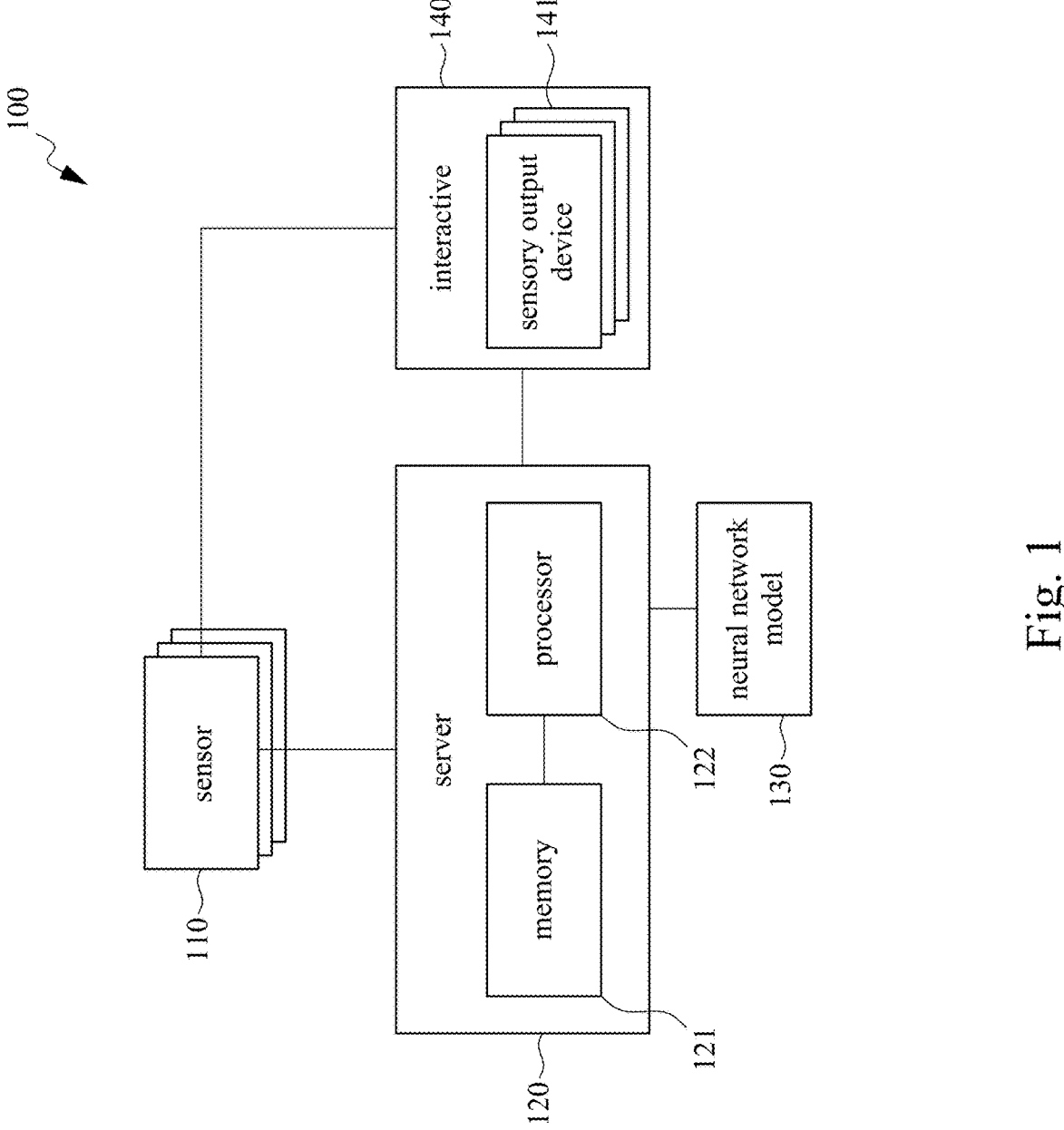
FIG. 1 depicts a schematic diagram of a multi-sensory human-computer interaction system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a multi-sensory human-computer interaction system 100 according to some embodiments of the present disclosure. The multi-sensory human-computer interaction system 100 includes a plurality of sensors 110, a server 120, a neural network model 130 and an interactive device 140. The sensors 110 are coupled to the server 120. The server 120 is coupled to the neural network model 130 and the interactive device 140 respectively.

In some embodiments, the sensors 110 include at least one of a visual sensor, an auditory sensor, a tactile sensor, an olfactory sensor, a gustatory sensor and a brain-computer interface device.

For example, the visual sensor can be implemented as an image sensor such as a camera, a camcorder and an infrared thermal camera. For example, the auditory sensor can be implemented as a radio microphone and a recorder. For example, the tactile sensor can be implemented as a touch panel and touch gloves. For example, the olfactory sensor can be implemented as an electronic nose. For example, the gustatory sensor can be implemented as electronic tongue. For example, the brain-computer interface device can be implemented as a brain-computer interface chip to be implanted in user's brain to connect the cranial nerves and spinal nerves. In some embodiments, the sensors 110 further include a temperature sensor, a heartbeat or a pulse sensor.

In some embodiments, the server 120 include a memory 121 and a processor 122. The memory 121 is coupled to the processor 122.

In some embodiments, the memory 121 includes a flash memory, hard disk drive (HDD), a solid state drive (SSD), a dynamic random access memory (DRAM) or a static random access memory (SRAM).

In some embodiments, the processor 122 includes but not limited to a single processor and an integration of many micro-processors, for example, a central processing unit (CPU), a digital signal processor (DSP) or a graphic processing unit (GPU) and so on.

In some embodiments, the neural network model 130 includes a transformer model. Transformer model is a deep learning model that uses an attention mechanism. This mechanism can assign different weights according to an importance of each part of pieces of input data. It should be further noted that, a type of the aforementioned neural network model is only an example, and the present disclosure is not limited thereto. It will be understood by those of ordinary skill in the art that various modifications and applications may be made without departing from essential characteristics of the aspects. For example, the elements described in detail in the above aspects may be modified. Furthermore, differences related to these modifications and applications should be construed as being covered by the scope of the invention as defined by the following claims.

In some embodiments, please refer to FIG. 1, the interactive device 140 can be implemented as a humanoid robot that can move freely in the real environment and has the ability to understand the situation in the real environment. In some embodiments, the interactive device 140 includes a plurality of sensory output devices 141.

In some embodiments, the sensory output devices 141 includes at least one of a visual output device, an auditory output device, a tactile output device, an olfactory output device, a gustatory output device and a brain-computer interface device. For example, the visual output device can be implemented as display panels of various devices (e.g.: a mobile phone or a computer), projectors and extend reality (XR) devices that connect the real environment and the virtual environment, or interactive multimedia technology devices (e.g.: combinations of vertical screens, screens and speakers, robot). Extend reality (XR) includes augmented reality (AR), virtual reality (VR) and mixed reality (MR). the auditory output device can be implemented as headphones, audio and a speaker. The olfactory output device and the gustatory output device can be implemented as a 3D printer that combines polymer compounds. The brain-computer interface device can be implemented as the aforementioned brain-computer interface chip. For example, the sensory output devices 141 can be implemented as a temperature regulator or a pulse to imitate human physiological conditions to make the user's experience more realistic.

Interactive multimedia technology is an interactive communication technology that uses between interactive multimedia technology devices (e.g.: combinations of vertical screens, screens and speakers, robot) and a user, allowing interactive multimedia technology devices to control or project robots or 3D virtual robots to interact with users, thereby making the entire interactive multimedia technology device more interesting.

In some embodiments, the sensory output devices 141 are disposed on the interactive device 140. In some embodiments, the sensory output devices 141 are communicatively connected to the interactive device 140. The sensory output devices 141 can be disposed in one or more rooms of a building. In some embodiments, the interactive device 140 is also coupled to the sensors 110.

Figure 2:
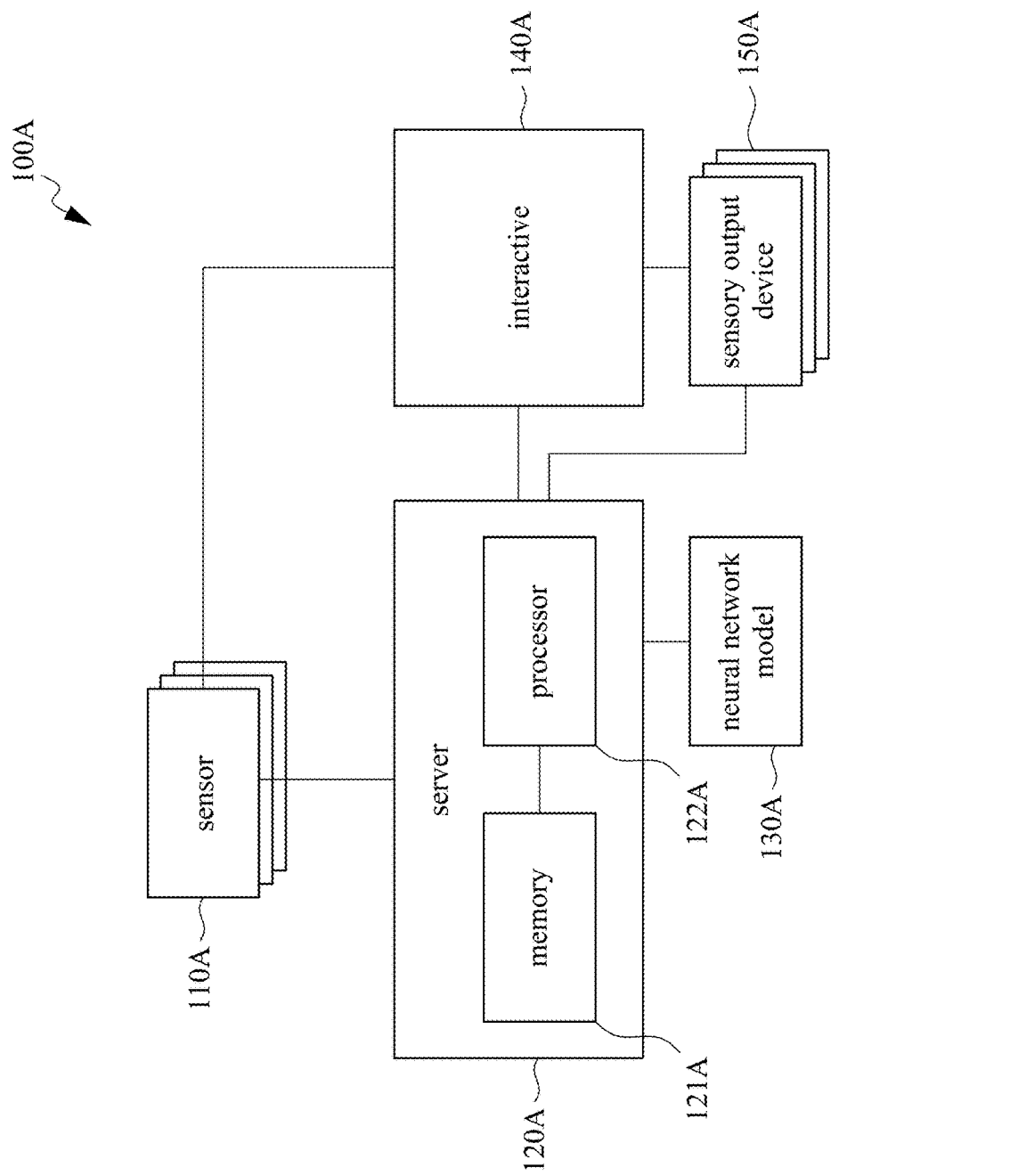
FIG. 2 depicts a schematic diagram of a multi-sensory human-computer interaction system according to some embodiments of the present disclosure.

FIG. 2 depicts a schematic diagram of a multi-sensory human-computer interaction system 100A according to some embodiments of the present disclosure. The multi-sensory human-computer interaction system 100A includes a plurality of sensors 110A, a server 120A, a neural network model 130, an interactive device 140 and a plurality of sensory output devices 150A. The sensors 110A are coupled to the server 120A. The server 120A is coupled to the neural network model 130A, the interactive device 140A and the sensory output devices 150A respectively. In some embodiments, the server 120A includes a memory 121A and a processor 122A. The memory 121A is coupled to the processor 122A.

Connection method and implementation device of the sensors 110A, the memory 121A and the processor 122A of the server 120A, the neural network model 130A, the interactive device 140A and the sensory output devices 150A are similar to corresponding components in the multi-sensory human-computer interaction system 100 in FIG. 1. For the sake of brevity, only the differences are described below.

In some embodiments, the sensory output devices 150A include at least one of a visual output device, an auditory output device, a tactile output device, an olfactory output device, a gustatory output device and a brain-computer interface device. For example, For example, the visual output device can be implemented as display panels of various devices (e.g.: a mobile phone or a computer), projectors and extend reality (XR) devices that connect the real environment and the virtual environment, or interactive multimedia technology devices (e.g.: combinations of vertical screens, screens and speakers, robot). Extend reality (XR) includes augmented reality (AR), virtual reality (VR) and mixed reality (MR). The auditory output device can be implemented as headphones, audio and a speaker. The olfactory output device and the gustatory output device can be implemented as a printer that combines polymer compounds. The brain-computer interface device can be implemented as the aforementioned brain-computer interface chip. For example, sensory output devices 150A can be implemented as a temperature regulator or a pulse to imitate human physiological conditions to make the user's experience more realistic.

In some embodiments, please refer to FIG. 2, the interactive device 140A can be implemented as a three dimensional (3D) virtual robot for projecting virtual reality. The interactive device 140A is coupled to the sensory output devices 150A to interact with customers or users in the real environment through the sensory output devices 150A and the sensors 110A. In some embodiments, the interactive device 140A is coupled the sensors 110A.

Compared with the interactive device 140 in FIG. 1, the sensory output devices 150A connected to the interactive device 140A can be dispersedly disposed in one or more rooms of a building. For example, the interactive device 140A can be implemented as MR glasses or AR glasses. The sensory output devices 150A can be implemented as a projector, headphones, audio and a speaker, 3D printer and the brain-computer interface chip. In some embodiments, the sensory output devices 150A can be micro-integrated into a portable device for customers or users to carry or wear.

In some embodiments, the interactive device 140 (e.g.: the humanoid robot) in FIG. 1 and the 3D virtual robot projected by the interactive device 140A in FIG. 2 can exist at the same time, and the humanoid robot and the 3D virtual robot can perform the same action synchronously.

In order to facilitate the understanding operations of multi-sensory human-computer interaction system 100 in FIG. 1 and the multi-sensory human-computer interaction system 100A in FIG. 2, please refer to FIG. 1 to FIG. 3. FIG. 3 depicts a flow chart of a multi-sensory human-computer interaction method 20 according to some embodiments of the present disclosure. The multi-sensory human-computer interaction method 20 includes steps S1 to S5. The multi-sensory human-computer interaction method 20 can be executed by the multi-sensory human-computer interaction system 100 in FIG. 1 and the multi-sensory human-computer interaction system 100A in FIG. 2. Following paragraphs will be explained with the multi-sensory human-computer interaction system 100A in FIG. 2. Following steps will be described with examples.

In step S1, please refer to FIG. 2 and FIG. 3, the sensors 110A of the multi-sensory human-computer interaction system 100A is configured to receive a plurality of sensing signals from a real environment.

For example, a first example was an elderly woman accidentally fell indoors. Through the sensors 110A (e.g.: an infrared thermal camera and a microphone) of the multi-sensory human-computer interaction system 100A, infrared thermal images of the elderly woman, an impact sound when she fell, and the elderly woman's wailing sound were received respectively.

For example, a second example was a young woman was shopping on a certain floor of a department store, and passed through a plurality of clothing counters and a plurality of jewelry counters. At this time, a fragrance gradually drifted from the floor, but the young woman did not notice it. Through the sensors 110A (e.g.: an image sensor and an electronic nose) of the multi-sensory human-computer interaction system 100A, images and fragrances of young woman passing through the clothing counters and the jewelry counters were received respectively.

In step S2, please refer to FIG. 2 and FIG. 3, the processor 122A of the server 120A of the multi-sensory human-computer interaction system 100A is configured to generate a piece of event data corresponding to each of the sensing signals according to sensing signals.

For example, following the first example from the step S1 above, the processor 122A of the server 120A of the multi-sensory human-computer interaction system 100A is configured to execute the neural network model 130A, to analyze the images (e.g.: the infrared thermal images) and sounds (e.g.: the impact sound when the elderly woman fell, and the elderly woman's wailing sound) of the sensors 110A (e.g.: the infrared thermal camera and the microphone) respectively.

Then, the processor 122A and the neural network model 130A of the server 120A of the multi-sensory human-computer interaction system 100A analyze the images and the sounds respectively and record them in text form. In detail, a content analyzed through the microphone by the processor 122A is "A momentary crashing sound and a continuous wailing sound came from the room". A situation in the room analyzed through the infrared thermal camera by the processor 122A is "There is a high-temperature object on the floor in the room, and a posture of the object has not changed".

For example, please refer to FIG. 2 and FIG. 3, following the second example from the step S1, the processor 122A of the server 120A of the multi-sensory human-computer interaction system 100A is configured to execute the neural network model 130A, to analyze the images (e.g.: the images of young woman passing through the clothing counters and the jewelry counters) and all kinds of smells in the air (e.g.: fragrances of perfume or other smells of an perfume counters) of the sensors 110A (e.g.: the image sensor and the electronic nose) respectively.

Then, the processor 122A and the neural network model 130A of the server 120A of the multi-sensory human-computer interaction system 100A analyze the images and the smells respectively and record them in text form, and use text as a piece of event data. The piece of event data represent situation of the real environment. In detail, the processor 122A is configured to analyze the images through the image sensor, and parse the content as "relative positions of various counters on the floor in the department store". The processor 122A is configured to analyze the situation in the space through the electronic nose, and parse the content as a plurality of types of perfume".

In some embodiments, the processor 122A of the server 120A is configured to perform a making operation on each of the pieces of event data by the server to generate a plurality of markers. The markers include at least one of a semantic maker, a distance maker and a sensory magnitude/intensity maker for the situation.

The semantic maker is a maker that is configured to identify meanings of text through words with different sensory stimulations (e.g. five senses and consciousness). The distance maker is a maker of distances or proximity between a user, the real environment and sources of sensory stimulations, such as centimeters or meters. The sensory magnitude/intensity maker is an intensity maker of sensory stimulations (e.g. five senses and consciousness), such as light intensity, sound decibels, concentration, etc.

In step S3, the processor 122A of the server 120A of the multi-sensory human-computer interaction system 100A is configured to generate pieces of multi-sensory correlation data corresponding to the situation according to the pieces of event data. In some embodiments, the processor 122A of the server 120A execute the neural network model 130A to analyze a plurality of markers of each of pieces of event data to generate pieces of multi-sensory correlation data. The pieces of multi-sensory correlation data represent at least one correlation relationship between the pieces of event data.

For example, please refer to FIG. 2 and FIG. 3, following the first example from the step S2 above, the processor 122A of the server 120A of the multi-sensory human-computer interaction system 100A is configured to analyze the situation of the elderly woman as "The hot-temperature object lying on the floor in the room is an elderly woman, and the elderly woman has just fallen" according to the visual and auditory semantic makers, distance makers and sensory magnitude/intensity makers as a piece of multi-sensory correlation data. The multi-sensory correlation data is that the processor 122A and the neural network model 130A integrate the semantic makers, distance makers and sensory magnitude/intensity makers of multiple senses (such as the visual sense and the auditory sense) to determine current state of an user (such as the elderly woman).

For example, following the second example from the step S2 above, the processor 122A of the server 120A of the multi-sensory human-computer interaction system 100A is configured to analyze the situation of the young woman as "The fragrance is perfume, and it seems that the closer you are to the young woman, the stronger the smell" according to the visual and olfactory semantic makers, distance makers and sensory magnitude/intensity makers. The multi-sensory correlation data is that the processor 122A and the neural network model 130A integrate the semantic makers, distance makers and sensory magnitude/intensity makers of multiple senses (such as the visual sense and the olfactory sense) to determine current state of an user (such as the young woman).

In step S4, please refer to FIG. 2 and FIG. 3, the processor 122A of the server 120A of the multi-sensory human-computer interaction system 100A is configured to a sensory feedback result according to the pieces of multi-sensory correlation data. In some embodiments, the processor 122A of the server 120A of the multi-sensory human-computer interaction system 100A is configured to perform a scoring operation on each of the pieces of multi-sensory correlation data to generate a correlation score (e.g.: user preference scores and user risk factor scores). The processor 122A of the server 120A is configured to compare correlation scores according to a plurality of present values to generate a plurality of comparison results. The processor 122A of the server 120A is configured to determine an action feedback of a plurality of senses of the interactive device as the sensory feedback result according to the comparison results.

For example, following the first example from the step S3 above, the processor 122A of the server 120A of the multi-sensory human-computer interaction system 100A is configured to score a plurality of correlation scores according to the aforementioned pieces of multi-sensory correlation data, for example, the user preference score is 5 points and the user risk factor scores is 95 points. Then, the processor 122A of the server 120A is configured to compare the aforementioned correlation scores with a preference preset value (e.g.: 60 points) and a risk preset value (e.g.: 60 points) respectively to generate a plurality of comparison results (e.g.: a preference comparison result is lower than the preference preset value, and a risk comparison result is greater than the risk preset value). The processor 122A of the server 120A is configured to determine actions (e.g.: a text content is about that interactive device 140A asking the elderly woman, concerned facial expressions and body movements), operations of the sensors 110A and the sensory output devices 150A of the interactive device 140A in the virtual environment as a sensory feedback result according to the comparison results.

It should be noted that types of scores can be designed according to actual needs and are not limited to the embodiment of the present disclosure.

For example, following the second example from the step S3 above, the processor 122A of the server 120A of the multi-sensory human-computer interaction system 100A is configured to score the correlation scores according to the aforementioned pieces of multi-sensory correlation data, for example, the user preference score is 3 points and the user risk factor scores is 70 points. Then, the processor 122A of the server 120A is configured to compare the aforementioned correlation scores with a preference preset value (e.g.: 60 points) and a risk preset value (e.g.: 60 points) respectively to generate a plurality of comparison results (e.g.: a preference comparison result is lower than the preference preset value, and a risk comparison result is greater than the risk preset value). The processor 122A of the server 120A is configured to determine actions (e.g.: a text content is about the interactive device 140A guiding the young woman, the friendly smile expression on the face, guiding gestures and other body movements), operations of the sensors 110A and the sensory output devices 150A of the interactive device 140A in the virtual environment as a sensory feedback result according to the comparison results.

In step S5, the processor 122A of the server 120A of the multi-sensory human-computer interaction system 100A is configured to generate an interactive message according to the sensory feedback result. The interactive message is configured to interact with a user. In some embodiments, the interactive message includes suggested actions to instruct users on situations.

In some embodiments, the processor 122A of the server 120A of the multi-sensory human-computer interaction system 100A is configured to generate an action feedback of a plurality of senses according to the sensory feedback result. The interactive device 140A is configured to assist a user to deal with the situation of the real environment through the action feedback.

For example, following the first example from the step S4 above, the interactive message is that the interactive device 140A combines the sensor 110A and the sensory output devices 150A to ask the elderly woman about her physical after the fall. Then, the interactive device 140A is configured to provide corresponding first aid measures according to the elderly woman's physical condition (e.g.: a minor sprain).

In addition, the interactive device 140A is configured to proactively assist the elderly woman in compiling a detailed distress message according to her physical conditions (e.g.: broken and unable to move), and transmit them for help to external parties such as family members' mobile devices (e.g. cell phones) or servers of health units (e.g. hospitals) through the Internet.

If the interactive device 140A is implemented as a humanoid robot, the interactive device 140A can assist the elderly woman in massaging the injured area, administering medicine or assisting in fixing the injured area with a bracket.

For example, following the second example from the step S4 above, the interactive message is that the interactive device 140A combines the sensor 110A and the sensory output devices 150A to show the young woman a map of the floor of the department store in the virtual environment, and operates the arm, facial expressions and voice of the 3D virtual robot projected by the interactive device 140A in the virtual reality and guide the young woman to a perfume counter. At the same time, the interactive device 140A can compile the current situation into detailed information to proactively assist in sending detailed information to the retail store's server, thereby allowing relevant units to take immediate measures, interact, and provide shopping guidance.

If the interactive device 140A is implemented as a humanoid robot, the interactive device 140A can assist in guiding her to the corresponding counter in the department store. In addition, the interactive device 140A can also search that floor of the department store to see if there are other things that customers may be interested in. At the same time, the interactive device 140A can compile the current situation into detailed information to proactively assist in sending detailed information to the retail store's server, thereby allowing relevant units to take immediate measures, interact, and provide shopping guidance.

For example, a third example is that a user wants to find the user wants to find someone to accompany and chat with. The user can simulate the user's virtual ideal object through the multi-sensory human-computer interaction system 100 (or the multi-sensory human-computer interaction system 100A) of the present disclosure. The multi-sensory human-computer interaction system 100 of the present disclosure can perform the aforementioned steps S1 to S5 during the process of chatting and accompanying. Details of step execution are similar to the above two examples, and repetitious details are omitted herein. Multi-sensory human-computer interaction system 100 can observe the user's heartbeat, body temperature, emotion, touch and other related information during the process of chatting and companionship, determine whether it is a suitable interaction according to the sensory feedback results and correct interaction of the interactive device 140 of the multi-sensory human-computer interaction system 100 according to the sensory feedback results. The multi-sensory human-computer interaction system 100 can meet the user's needs and is willing to interact with virtual ideal objects for a long time.

Based on the aforementioned embodiments, the present disclosure provides a technology for a multi-sensory human-computer interaction system and a multi-sensory human-computer interaction method, which can provide users with an immersive experience. Through augmented reality, virtual reality, mixed reality and interactive multimedia technology (Kiosk) technology, users can experience realistic multi-sensory effects, making the experience more real. In addition, the multi-sensory human-computer interaction system can actively assist or provide suggestions to allow users to deal with real-world situations.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A multi-sensory human-computer interaction system, comprising:
   an interactive device;
   a plurality of sensors; and a server, coupled to the sensors, and configured to control the interactive device;
   wherein, the multi-sensory human-computer interaction system executes following operations:
   receiving a plurality of sensing signals from a real environment respectively by each of the sensors;
   generating a piece of event data corresponding to each of the sensing signals according to sensing signals by the server, wherein the pieces of event data represent a situation of the real environment;
   generating pieces of multi-sensory correlation data corresponding to the situation according to the pieces of event data by the server;
   determining a sensory feedback result according to the pieces of multi-sensory correlation data by the server;
   performing a scoring operation on each of the pieces of multi-sensory correlation data by the server to generate a correlation score by the server;
   comparing correlation scores according to a plurality of present values respectively by the server to generate a plurality of comparison results by the server;
   determining an action feedback of a plurality of senses of the interactive device as the sensory feedback result according to the comparison results by the server; and
   generating an interactive message according to the sensory feedback result by the interactive device, wherein the interactive message is configured to interact with a user.

2. The multi-sensory human-computer interaction system of claim 1, wherein the multi-sensory human-computer interaction system executes following operations:
   performing a making operation on each of the pieces of event data by the server to generate a plurality of markers, wherein the markers comprise at least one of a semantic marker, a distance marker and a sensory magnitude/intensity marker for the situation.

3. The multi-sensory human-computer interaction system of claim 2, wherein the multi-sensory human-computer interaction system executes following operations:
   analyzing the markers between the each of the pieces of event data to generate the pieces of multi-sensory correlation data by the server, wherein the pieces of multi-sensory correlation data represent at least one correlation relationship between the pieces of event data.

4. The multi-sensory human-computer interaction system of claim 3,
   wherein each of the senses corresponds to one of a visual sense, an auditory sense and a tactile sense.

5. The multi-sensory human-computer interaction system of claim 1, wherein the interactive device is a humanoid robot with an ability to understand the situation in the real environment.

6. The multi-sensory human-computer interaction system of claim 1, wherein the interactive device is configured to project a virtual robot into a virtual reality, wherein the virtual robot is coupled to a plurality of sensory output devices to generate an action feedback of a plurality of senses through the sensory output devices, wherein each of the senses corresponds to one of a visual sense, an auditory sense and a tactile sense.

7. The multi-sensory human-computer interaction system of claim 1, wherein the plurality of sensors comprise at least one of a visual sensor, an auditory sensor and a tactile sensor.

8. The multi-sensory human-computer interaction system of claim 1, wherein the multi-sensory human-computer interaction system executes following operations:

generating an action feedback of a plurality of senses according to the sensory feedback result by the interactive device; and assisting a user to deal with the situation of the real environment through the action feedback by the interactive device.

9. A multi-sensory human-computer interaction method, executed following steps through a multi-sensory human-computer interaction system, wherein the multi-sensory human-computer interaction method comprises:

receiving a plurality of sensing signals from a real environment;

generating a piece of event data corresponding to each of the sensing signals according to sensing signals, wherein the pieces of event data represent a situation of the real environment;

generating pieces of multi-sensory correlation data corresponding to the situation according to the pieces of event data;

determining a sensory feedback result according to the pieces of multi-sensory correlation data;

performing a scoring operation on each of the pieces of multi-sensory correlation data to generate a correlation score;

comparing correlation scores according to a plurality of present values to generate a plurality of comparison results;

determining an action feedback of a plurality of senses of an interactive device as the sensory feedback result according to the comparison results; and generating an interactive message according to the sensory feedback result to control an interactive device, wherein the interactive message is configured to interact with a user.

10. The multi-sensory human-computer interaction method of claim 9, wherein generating the piece of event data corresponding to each of the sensing signals according to the sensing signals comprises:

performing a making operation on each of the pieces of event data to generate a plurality of markers, wherein the markers comprises at least one of a semantic marker, a distance marker and a sensory magnitude/intensity marker.

11. The multi-sensory human-computer interaction method of claim 10, wherein generating the piece of event data corresponding to each of the sensing signals according to the sensing signals further comprises:

analyzing the markers between the each of the pieces of event data to generate the pieces of multi-sensory correlation data, the pieces of multi-sensory correlation data represent at least one correlation relationship between the pieces of event data.

12. The multi-sensory human-computer interaction method of claim 11, wherein each of the senses corresponds to one of a visual sense, an auditory sense and a tactile sense.

13. The multi-sensory human-computer interaction method of claim 9 wherein the interactive device is a humanoid robot with an ability to understand the situation in the real environment.

14. The multi-sensory human-computer interaction method of claim 9, wherein the interactive device is configured to project a virtual robot into a virtual reality, wherein the virtual robot is coupled to a plurality of sensory output devices to generate an action feedback of a plurality of senses through the sensory output devices, wherein each of the senses corresponds to one of a visual sense, an auditory sense and a tactile sense.

15. The multi-sensory human-computer interaction method of claim 9, further comprising:

generating an action feedback of a plurality of senses according to the sensory feedback result; and assisting a user to deal with the situation of the real environment through the action feedback.

* * * * *